United States Patent [19]

Harada et al.

[11] Patent Number: 5,017,850

[45] Date of Patent: May 21, 1991

[54] MOBILE MEMBER CONTROL APPARATUS

[75] Inventors: Hiroyuki Harada, Osaka; Yasumasa Matsuura, Nishinomiya; Toshihiko Araki, Kobe; Tetsuji Kajitani, Kawanishi, all of Japan

[73] Assignee: Mita Industrial Co., Ltd., Osaka, Japan

[21] Appl. No.: 433,903

[22] Filed: Nov. 9, 1989

[30] Foreign Application Priority Data

Nov. 12, 1988 [JP] Japan .................................. 63-286341

[51] Int. Cl.$^5$ ............................................ G05B 11/28
[52] U.S. Cl. .................... 318/599; 318/626; 318/696; 318/685; 318/258; 388/810; 187/116
[58] Field of Search ............... 318/599, 626, 696, 685, 318/258; 388/810; 187/116; 355/235

[56] References Cited

U.S. PATENT DOCUMENTS

| | | | |
|---|---|---|---|
| 4,337,428 | 6/1982 | Oltendorf | 318/696 |
| 4,485,895 | 12/1984 | Taebino et al. | 187/116 |
| 4,698,567 | 10/1987 | Gottwald et al. | 388/810 |
| 4,739,231 | 4/1988 | Miyata et al. | 318/369 |
| 4,751,984 | 6/1988 | Williams et al. | 187/116 |

Primary Examiner—William M. Shoop, Jr.
Assistant Examiner—Saul M. Bergmann
Attorney, Agent, or Firm—Sandler, Greenblum & Bernstein

[57] ABSTRACT

A mobile member control apparatus is provided having a motor for moving a mobile member from a first position to a third position through a second position. The apparatus includes: a sensing device for sensing the travel speed and position of the mobile member; a speed presetting device for presetting upper and lower speed limit values, with the values becoming smaller as the mobile member travels closer to the third position; a deceleration rate presetting device for presetting at least two deceleration rates, Large and small; a comparing device for comparing the actual travel speed with the upper and lower limit values; and a motor control device for decelerating the motor, according to either the large or small deceleration rate, when the mobile member reaches the second position, and for decelerating the motor according to the large deceleration rate when the travel speed for the mobile member is greater than or equal to the upper limit value, and for decelerating the motor according to the small deceleration rate when the travel speed of the mobile member is less than or equal to the lower limit value.

11 Claims, 12 Drawing Sheets

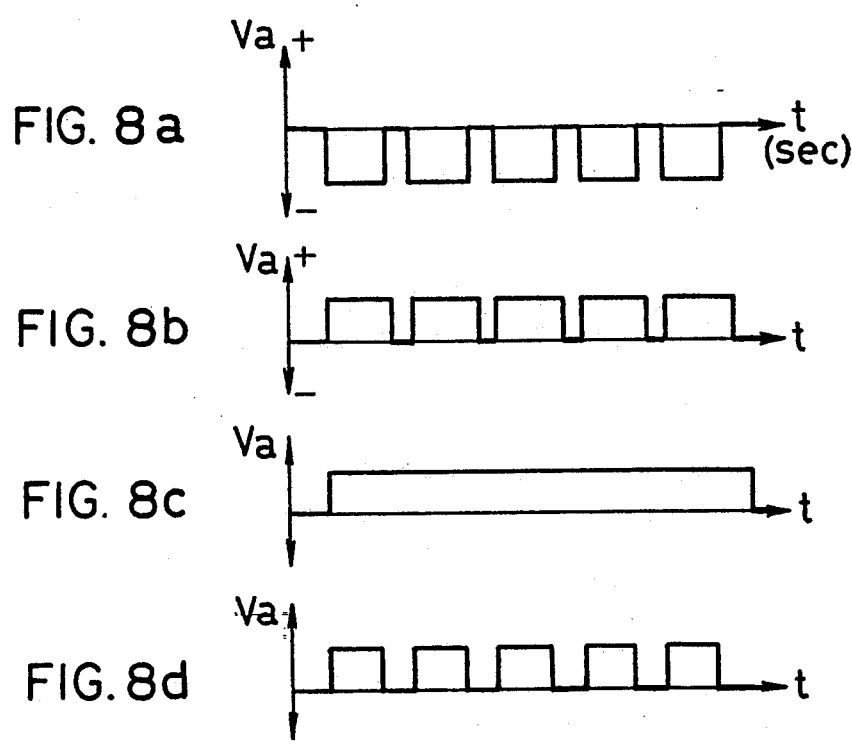

MOBILE MEMBER CONTROL APPARATUS

BACKGROUND OF THE INVENTION

1. Field of the Invention

The present invention relates to a mobile member control apparatus, and more particularly relates to a control apparatus for controlling speed and position of a mobile member, such as an optical system in an electrophotographic copying machine and an original reading/writing head in a facsimile device.

2. Description of the Prior Art

Conventionally, in this type of mobile member control apparatus, speed and position of the mobile member are detected in predetermined sections and a required deceleration rate is calculated every time, for every section so that the speed of the mobile member is reduced according to the deceleration rate given by the calculation (Refer to Japanese Patent Laid-Open No. 511-1985).

In such a mobile member control apparatus, however, a calculation frequency is increased when the mobile member travels at high speed, because the deceleration rate of the mobile member is calculated for each of the predetermined sections. This increases the burden for a control unit (microcomputer) in arithmetic processing. On the other hand, if each of the sections on which a deceleration rate is calculated are set wider to reduce the burden, problem in speed and position control accuracy, namely, control reliability, arises.

SUMMARY OF THE INVENTION

The present invention provides a mobile member control apparatus having a motor for accelerating a mobile member to move it from a first position, decelerating the mobile member after it reaches a second position and stopping the mobile member at a third position, comprising: speed sensing means for sensing a travel speed of the mobile member; position detecting means for detecting a position of the mobile member; speed presetting means for presetting upper and lower limit speed values, the upper and lower limit values being a function of the displacement of the mobile member, and becoming smaller as the mobile member travels closer to the third position; deceleration rate presetting means for presetting at least two deceleration rates, large and small; comparing means for comparing a travel speed received from the speed sensing means with the upper and lower limit values; motor control means for decelerating the motor according to either of the large or small deceleration rate when the position detecting means detects that the mobile member reaches the second position, decelerating the motor according to the large deceleration rate when a travel speed of the mobile member is equal to or exceed upper limit value, and decelerating the motor in accordance with the small deceleration rate when the travel speed of the mobile member is less than or equal to lower limit value.

The present invention further provides a mobile member control apparatus having a motor for accelerating a mobile member to move it from a first position and for decelerating the mobile member to stop it at a second position, comprising: speed sensing means for sensing a travel speed of the mobile member; position detecting means for detecting a position of the mobile member; speed presetting means for presetting upper and lower limit values in speed values which are a function of the displacement of the mobile member and which become smaller as the mobile member travels closer to the second position; first comparing means for comparing a travel speed received from the speed sensing means with the upper and lower limit values; deceleration start speed presetting means for presetting a speed at which deceleration is started, the deceleration start speed being a value between the upper and lower limit values, and being given as a function of the displacement of the mobile member and becoming smaller as the mobile member travels closer to the second position; second comparing means for comparing the travel speed received from the speed sensing means with the deceleration start speed; deceleration rate presetting means for presetting at least two deceleration rates, large and small; motor control means for decelerating the motor according to either of the large or small deceleration rate when the travel speed of the mobile member reaches the deceleration start speed, decelerating the motor according to the large deceleration rate when the travel speed of the mobile member reaches or exceeds the upper limit value, and decelerating the motor according to the small deceleration rate when the travel speed of the mobile member reaches or goes below the lower limit value.

The aforementioned upper and lower limit values in speed and the deceleration start speed can be determined by a linear function of a displacement of the mobile member. The motor control means preferably accelerates and decelerates the motor by a PWM control, although the motor control means are not limited to this method of control. The speed sensing means and the position detecting means are formed by a rotary encoder, for example, which is connected to the motor. The mobile member control apparatus includes a microcomputer having a ROM, a RAM, a CPU, and other components. Preferably, the microcomputer serves as the speed presetting means, the deceleration rate presetting means, the comparing means, the deceleration start speed presetting means and the motor control means.

BRIEF DESCRIPTION OF THE DRAWINGS

FIGS. 8a–8c are diagrams showing waveforms of voltage applied to a motor shown in FIG. 7;

DESCRIPTION OF THE PREFERRED EMBODIMENTS

Figure 1:
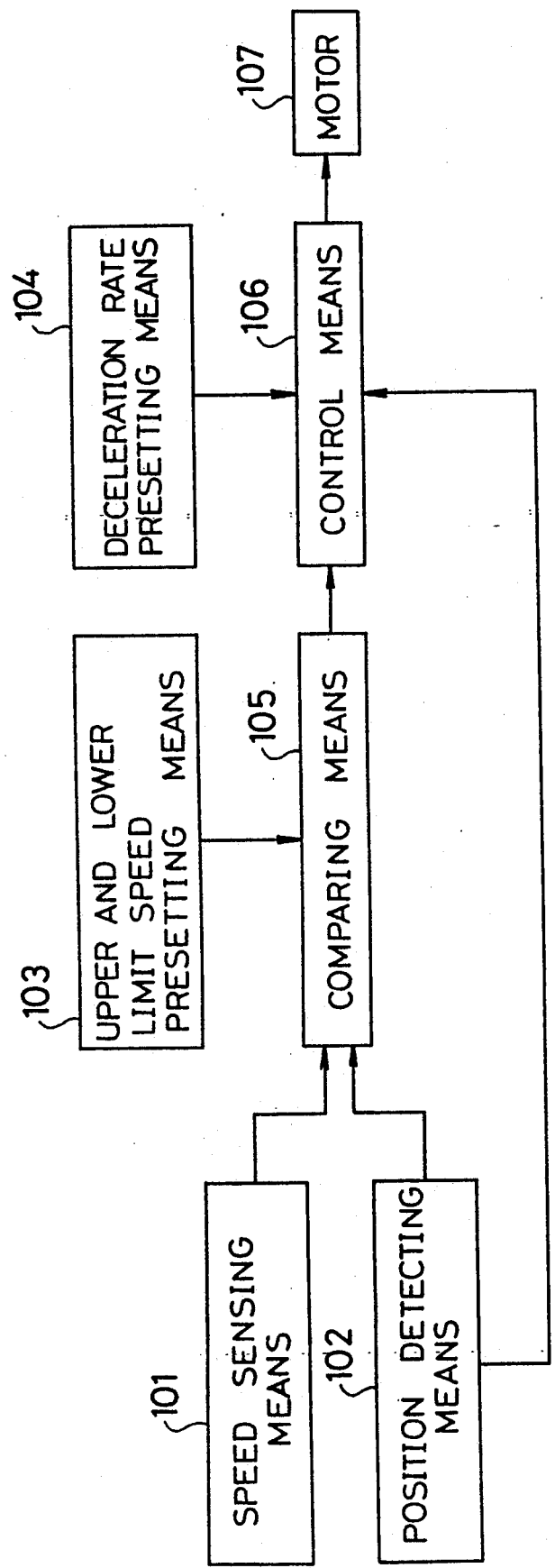
FIGS. 1 and 2 are block diagrams showing a basic architecture of a control apparatus according to the present invention.
Figure 2:
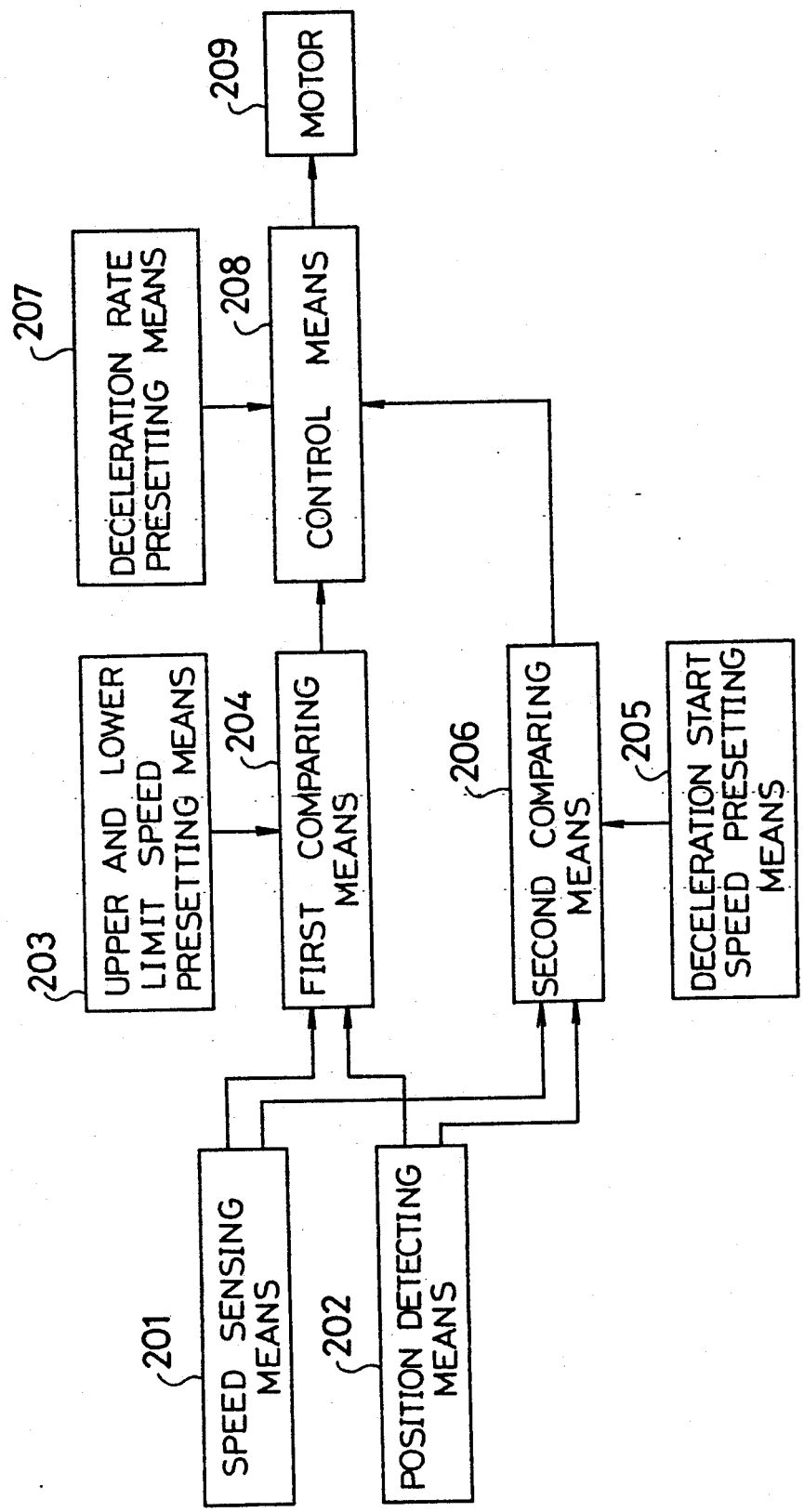

Now embodiments according to the present invention will be described in detail with reference to the drawings. It is not intended that the present invention is limited to the precise form disclosed. FIGS. 1 and 2 are block diagrams showing a basic architecture of each of control devices according to the present invention.

The control device shown in FIG. 1 comprises: speed sensing means 101 for sensing a travel speed of a mobile member, which travels from a first position through a second position to a third position, position detecting means 102 for the presence of the mobile member, and upper and lower limit speed presetting means 103 for presetting upper and lower limit values of speed. These values are expressed as a linear function of the distance from a position where the mobile member is in the third position, and which become smaller as the mobile member travels closer to the third position. The device also includes deceleration rate presetting means 104 for presetting at least two deceleration rates, large and small, comparing means 105 for comparing a travel speed received from the speed sensing means 101 with the upper and lower limit values, and motor control means 106 for decelerating a motor 107 according to either of the large or small deceleration rates when the mobile member reaches the second position, decelerating the motor 107 according to the large deceleration rate when the travel speed of the mobile member reaches the upper limit value, and decelerating the motor 107 according to the small deceleration rate when the travel speed of the mobile member reaches the lower limit value.

Figure 3:
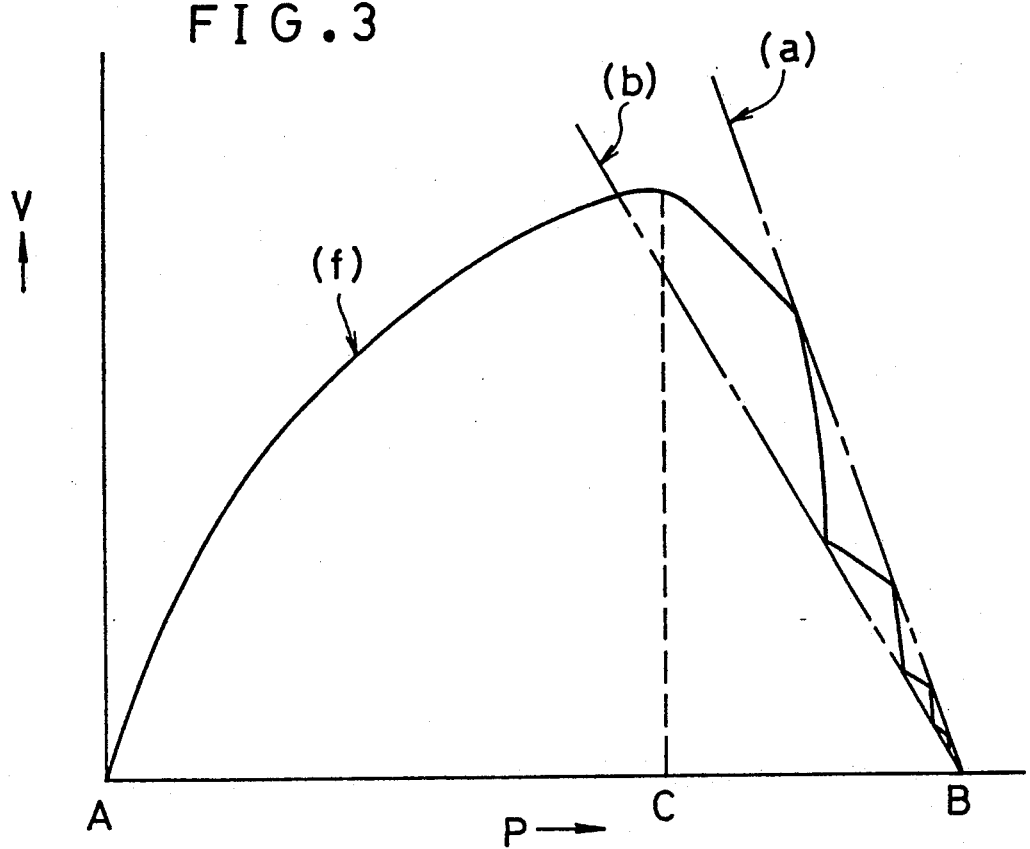
FIG. 3 is a graph explaining the operation of the control apparatus shown in FIG. 1.

The operation of the embodiment shown in FIG. 1 will be described with reference to FIG. 3. FIG. 3 is a graph showing relations between position P (on an axis of abscissas) and speed V (on an axis of ordinates) of the mobile member with a curve (f). The mobile member accelerates from the first position A, decelerates after it reaches the second position C, and stops at the third position B. Lines (a) and (b) are functions which represent the upper and lower limit values in speed, preset in the upper and lower limit speed presetting means 103, respectively. When the position detecting means 102 detects that the mobile member has reached the second position C, the control means decelerates the motor according to either the large or small deceleration rate (the small deceleration rate in this case) preset in the deceleration presetting means 104 (for example, the small deceleration rate can be preset in the deceleration presetting means). The comparing means 105 compares a speed of the mobile member with the upper and lower limit values in speed given as the functions (a), (b), so that the motor 107 is decelerated according to the large deceleration rate when the travel speed of the mobile member reaches the upper limit value, and the motor 107 is decelerated according to the small deceleration rate when the travel speed of the mobile member reaches the lower limit value. Thus, the reduction of speed V of the mobile member varies in a region between functions (a), (b), and eventually the mobile member stops at the third position B with high accuracy. By decelerating the mobile member in the above mentioned manner, the burden for the control apparatus can be reduced because the mobile member can be stopped at a predetermined position with high accuracy without calculating a deceleration rate in each the predetermined sections and controlling the speed of the mobile member every time.

The control apparatus shown in FIG. 2 comprises: speed sensing means 201 for sensing a travel speed of a mobile member which travels from a first position to a second position; position detecting means 202 for detecting a position of the mobile member; upper and lower limit speed presetting means 203 for presetting upper and lower limit values in speed which are given as a linear function of the distance from the actual position of the mobile member with respect to the second position, and which become smaller as the mobile member travels closer to the second position; first comparing means 204 for comparing a travel speed received from the speed sensing means 201 with the upper and lower speed limit values in speed in relation to the position of the mobile member; deceleration start speed presetting means 205 for presetting a speed of the mobile member at which deceleration begins, between the upper and lower limit values in speed, which is given as a linear function of the displacement of the mobile member with respect to the second position, and which becomes smaller as the mobile member travels closer to the second position; second comparing means 206 for comparing a travel speed received from the speed sensing means 201 with the deceleration start speed; deceleration rate presetting means 207 for presetting at least two deceleration rates, large and small; and motor control means 208 for decelerating the motor according to either of the large or small deceleration rates when the speed of the mobile member reaches the deceleration start speed, decelerating the motor according to the large deceleration rate when the travel speed of the mobile member reaches the upper limit value, and decelerating the motor according to the smaller deceleration rate when the travel speed of the mobile member reaches the lower limit value.

Figure 4:
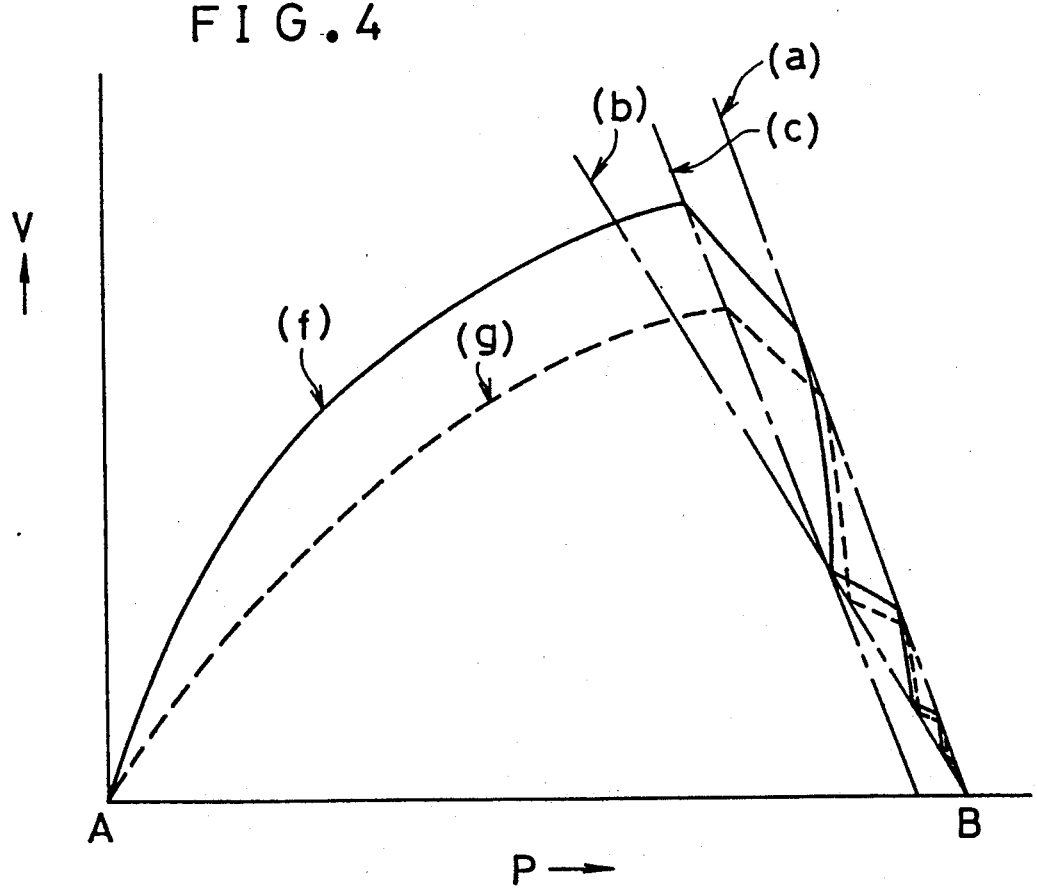
FIG. 4 is a graph explaining the operation of the control apparatus shown in FIG. 2.

The operation of the embodiment shown in FIG. 2 will be described with reference to FIG. 4. FIG. 4 is a graph showing the relationship between position P and speed V of the mobile member with a curve (f) similar to that of FIG. 3. The curve (f) shows a situation in which the mobile member accelerates from the first position A, and then decelerates and stops at the second position B. Lines (a) and (b) are functions representing the upper and lower limit values in speed which are preset in the upper and lower limit speed presetting means 203, respectively. Lines (c) is a function representing a speed at which deceleration is started, with the speed preset at the deceleration start speed presetting means 205. Speed and position of the mobile member are detected by the speed sensing means 201 and the position detecting means 202. When the travel speed of the mobile member reaches the deceleration start speed (c), the control means 208 decelerates the motor 209 according to either the large or small deceleration rates which are preset in the deceleration rate presetting means 207. In the present example, the smaller deceleration rate is preset in the deceleration rate presetting means 207. Furthermore, as can be seen from FIG. 4., the deceleration start speed, represented by line (c), decreases at positions closer to second position B. When the speed of the mobile member reaches the upper limit value (a), the control means 208 decelerates the motor 209 according to the large deceleration rate. On the other hand, the control means 208 decelerates the motor 209 according to the small deceleration rate when the travel speed of the mobile member reaches the lower limit value (b). Thus the mobile member stops at the second position with high accuracy in such a manner that the speed V of the mobile member is reduced bounded and vacillating between functions (a), (b) as can be seen in FIG. 4. A curve (g) shows relations between position P and speed V in the case where there is a variation in load, for example, which makes the speed of the mobile member which is accelerating change. Similar to the case with the curve (f), deceleration is started after a speed of the mobile member reaches a value determined by the function (c) to reduce the speed V between the functions (a) and (b) so that the mobile member stops at the second position B with high accuracy. Thus, by controlling the mobile member in the above mentioned manner, there is no need for the control means to calculate a deceleration rate in many sections, so that the burden on the control means is lightened. Further, even if an acceleration condition of the mobile member varies, for example, due to a variation in load, a deceleration start speed is determined accordingly, so that braking is controlled with high accuracy.

A case where the control device according to the present invention is applied to an electrophotographic copying machine to control the movement of an optical system will be described in below.

Figure 5:
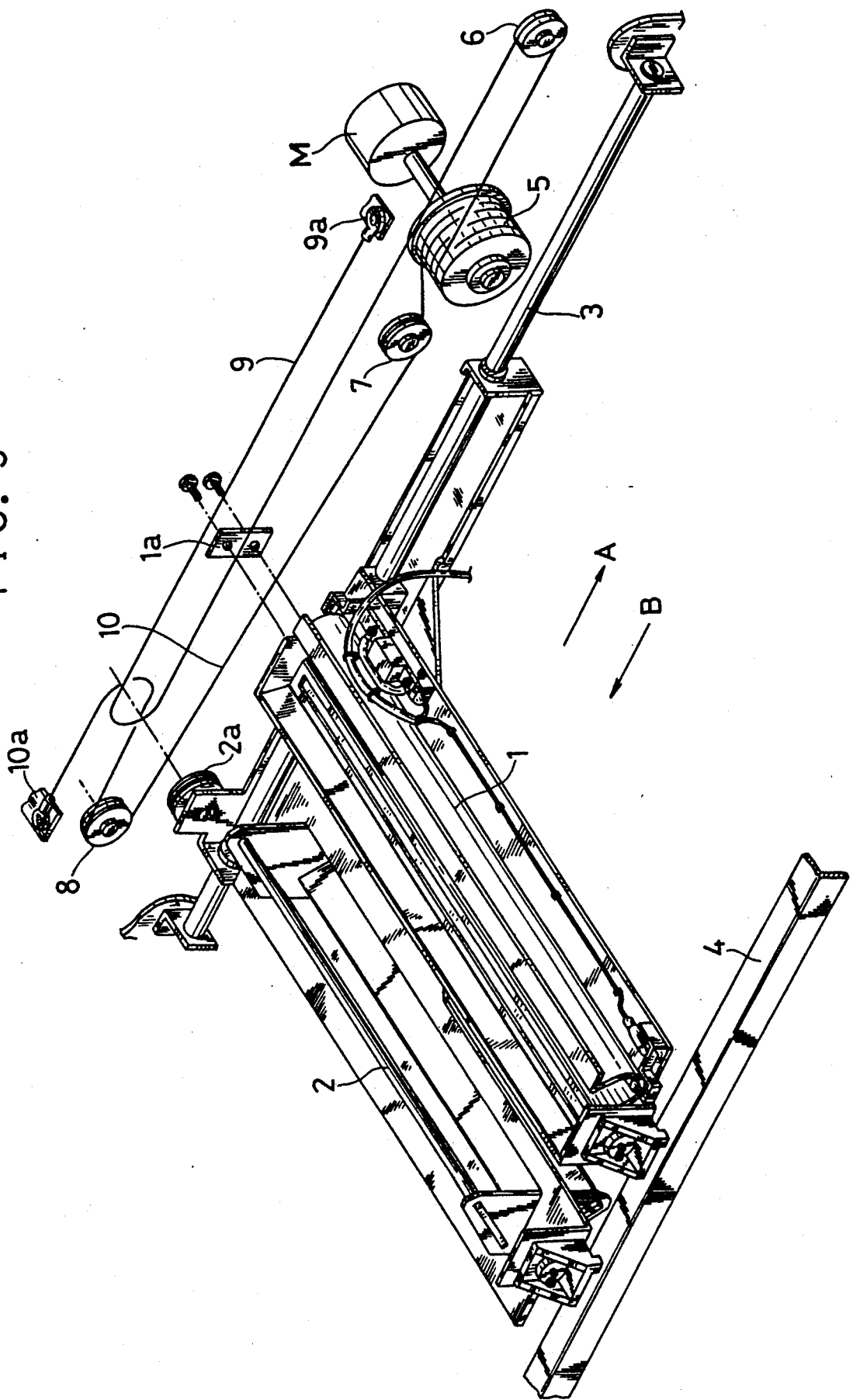
FIG. 5 is a perspective view showing a main portion of an optical system in an electrophotographic copying machine.

FIG. 5 is a perspective view showing a main portion of the optical system in the electrophotographic copying machine. The optical system comprises a lamp unit 1 holding an exposure lamp for exposing an original to light, and a mirror unit 2 for reflecting the light reflected from the original to a photosensitive drum (not shown). A shaft 3 is provided for slidably supporting one end of the lamp unit 1 and the mirror unit 2, and a guide plate 4 is provided for slidably supporting the other end of the lamp unit 1 and the mirror unit 2. A motor M drives a driving pulley 5, connected to an output shaft of the motor M. Pulleys 6, 7, 8 are held in the body of the copying machine, a wire 9 having its one end connected to the driving pulley 5 and the other end connected to a holding member 9a, extends between the fixed pulley 6 and a pulley 2a attached to the mirror unit 2. A wire 10 has one end connected to the driving pulley 5 and the other end connected to a holding member 10a, and extends among the pulleys 7, 8, 2a, a fixes member 1a for fixing the wire 9 to the lamp unit 1. In this arrangement of the optical system, the lamp unit 1 and the mirror unit 2 travel in a forward direction shown by the arrow A to expose and scan the original when the motor M rotates the shaft in the counterclockwise direction (forward rotation), or they travel in a reverse direction shown in an arrow B to return to the original position when the motor M rotates in the clockwise direction (reverse rotation). In this case, the travel speed of the mirror unit 2 is half of that of the lamp unit 1.

Figure 6:
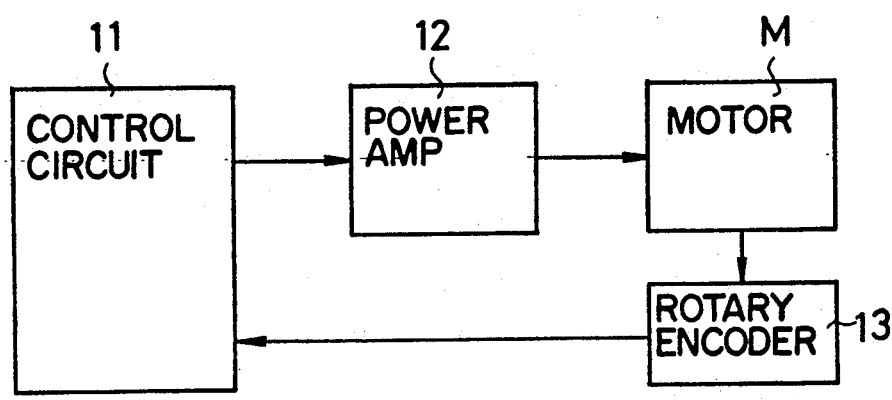
FIG. 6 is a block diagram showing a control unit of the optical system shown in FIG. 5.
Figure 7:
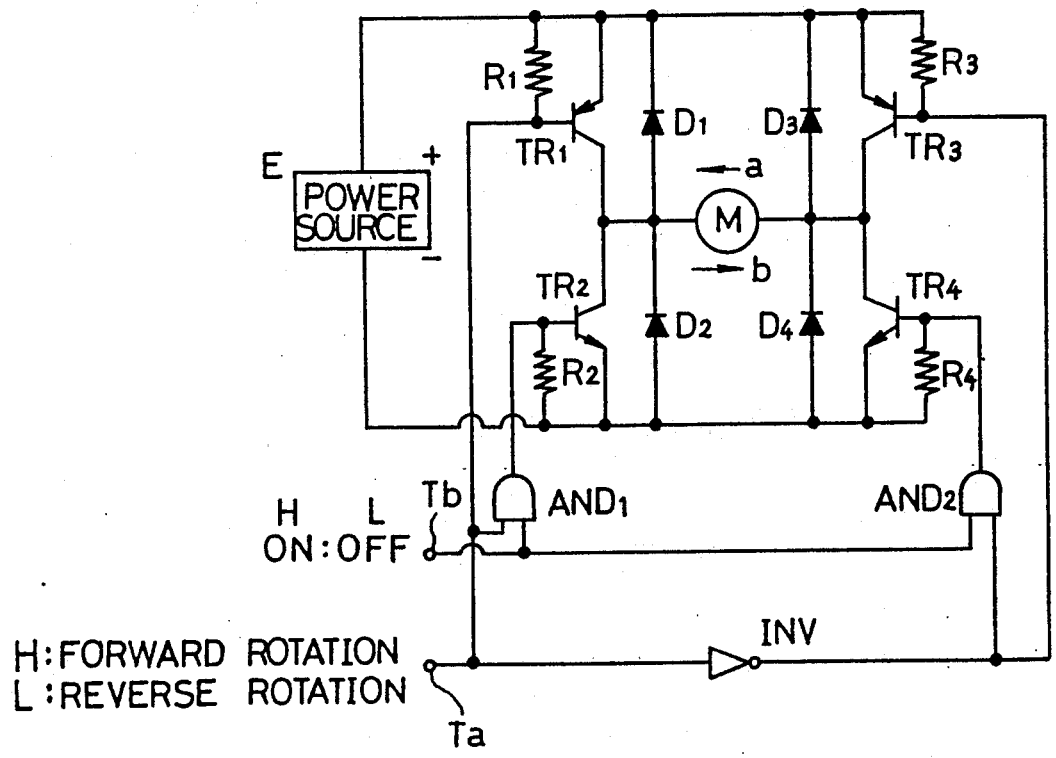
FIG. 7 is a circuit diagram showing a main portion of FIG. 6.

FIG. 6 is a block diagram showing a control unit of the embodiment shown in FIG. 5. The control unit comprises a control circuit 11 including a microcomputer made up of a RAM, a ROM, a CPU, and other components a power amplifier 12 for driving the motor M, and a rotary encoder 13 connected to the motor M. FIG. 7 is a circuit diagram showing the power amplifier 12 shown in FIG. 6. The power amplifier 12 comprises a power source E, power transistors TR1 to TR4, diodes D1 to D4, resistances R1 to R4, AND gates AND1, AND2, an inverter INV, and input terminals Ta, Tb. When a HIGH signal is applied to each of the input terminals Ta, Tb, current flows from the power source E to the motor M through the transistors TR3, TR2 in a direction shown in the arrow "a". This allows the motor M to rotate in the forward direction, so that the lamp unit 1 (along with the mirror unit 2) is moved in the forward direction. When a HIGH signal is applied to the input terminal Tb and a LOW signal is applied to the input terminal Ta, current flows from the power source E to the motor M through the transistors TR1 and TR4 in a direction shown in the arrow "b". This allows the motor M to rotate in the reverse direction, so that the lamp unit 1 (along with the mirror unit 2) is moved in the reverse direction. When either a HIGH signal or a LOW signal is applied to the input terminal Ta and a LOW signal is applied to the input terminal Tb, the current flow to the motor M is stopped. When current flows to the motor M in the direction shown in the arrow "b" while the motor M is rotating in the forward direction or when current flows to the motor M in the direction shown in the arrow "a" while the motor M is rotating in the reverse direction, the rotation of the motor M is reversed. Thus, the motor M is rotated under a PWM control by applying a pulse signal to each of the input terminals Ta, Tb of the power amplifier 12 in the control circuit 11.

Figure 9B:
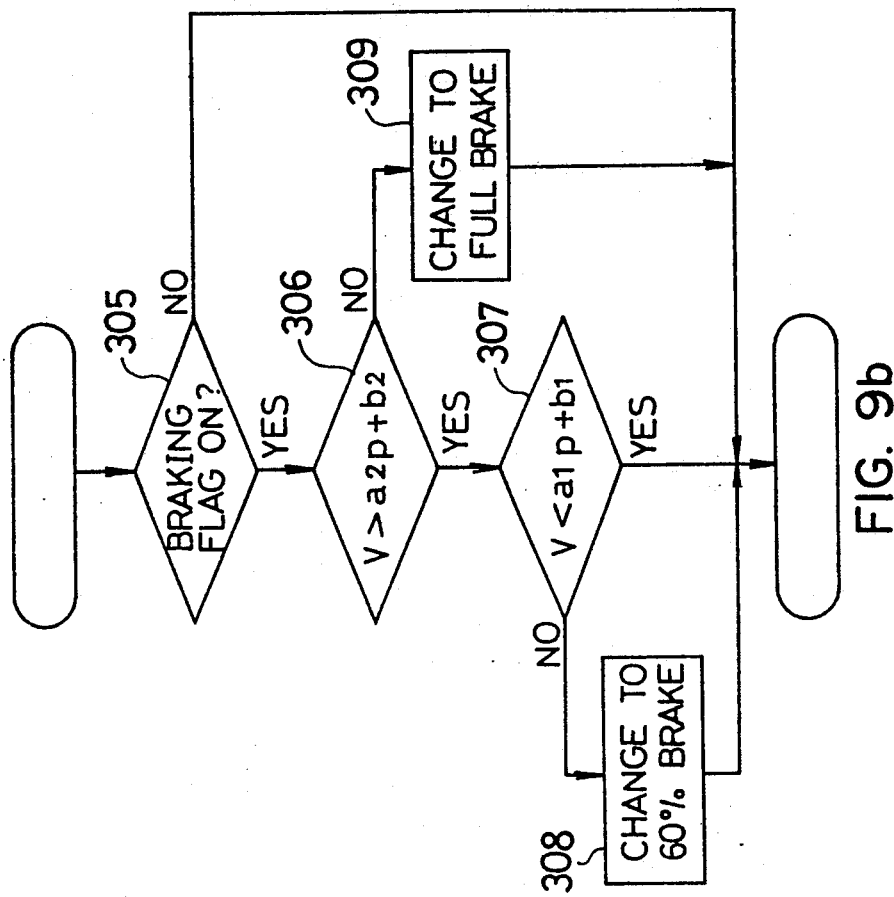
FIGS. 9(a) and (b), 11(a) and (b), 13(a) and (b) and 15(a) and (b) are flow charts showing the operation in embodiments according to the present invention.
Figure 9A:
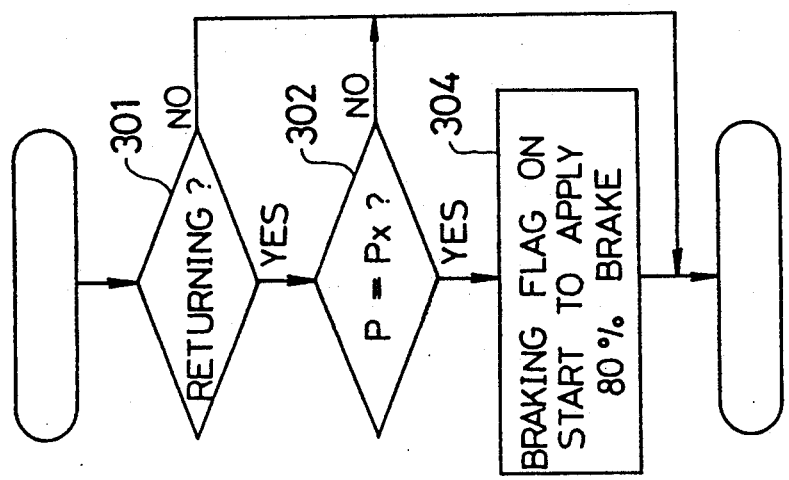
Figure 10:
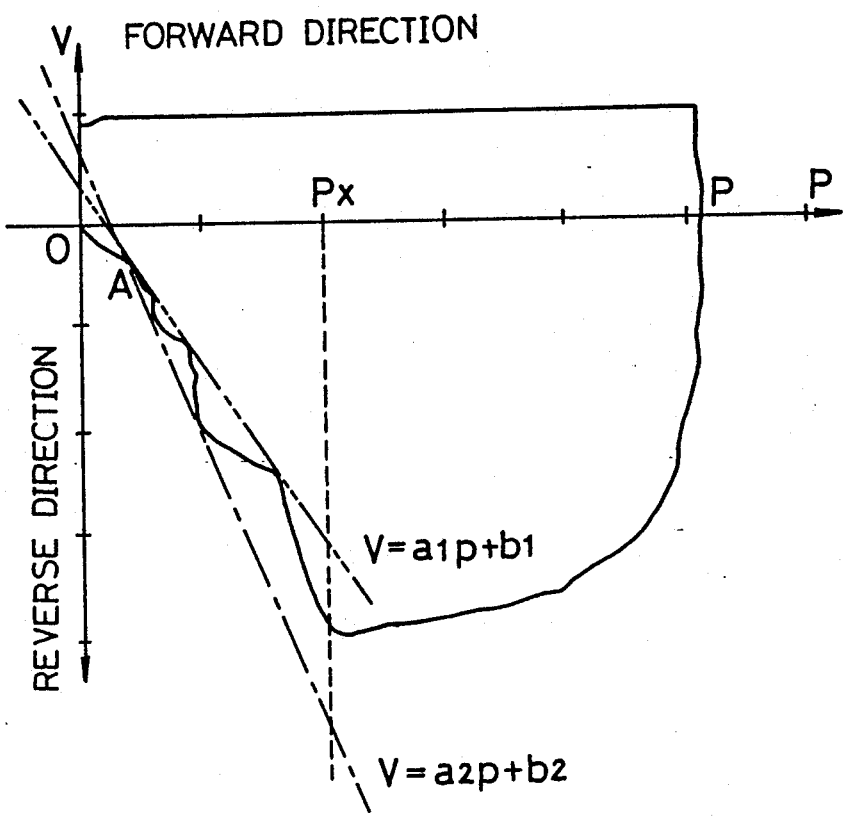
FIGS. 10, 12, 14 and 16 are graphs showing position-speed properties corresponding to FIGS. 9, 11, 13 and 15, respectively.

FIG. 8 shows examples of a waveform of voltage Va at a terminal of the motor M: FIG. 8(a) shows a waveform of voltage applied to the motor M when the motor M is driven in the reverse direction, FIG. 8(b) shows a waveform of voltage applied when the motor M rotating in the reverse direction is controlled by 80% braking, FIG. 8(c) shows a waveform of voltage applied to the motor M when the motor M rotating in the reverse direction is controlled by full braking, and FIG. 8(d) shows a waveform of voltage applied to the motor M when the motor M rotating in the reverse direction is controlled by 60% braking. The operation of the control apparatus which has the aforementioned constitution will be described in conjunction with flow charts in FIG. 9 and a graph in FIG. 10, showing relations between position P and speed V with a P-V curve. FIG. 10 is a graph in which values corresponding to position P of the lamp unit 1 (or of the mirror unit 2) are on the abscissas axis and those corresponding to its speed V are on the ordinate axis, with positive number corresponding to positions during the movement in the forward direction. In this coordinate system, the original position of the lamp unit 1 is predetermined as P=0. First, the motor M starts and rotates in the forward direction at a predetermined speed. Then, when the lamp unit 1 (or the mirror unit 2) reaches a position P1 where the exposure scanning is stopped, the voltage shown in FIG. 8(a) is applied to the motor M. This allows the motor M to rotate reversely, so that the lamp unit 1 travels in the reverse direction with its speed increased (step 301). When the lamp unit 1 reaches a point Px which is preset and stored in the control circuit 11 (step 302), a braking flag turns ON in the control circuit 11 and voltage of the waveform shown in FIG. 8(b) is applied to the motor M. This allows the motor to be controlled by 80% braking (step 304). While the braking flag is ON, namely, while the motor M is being controlled by braking (step 305), the speed V, the upper limit value in speed (a1P+b1) and the lower limit value (a2P+b2) are all compared to one another, and V>a2P+b2 is obtained (step 306). If V<a1P+b1 (step 307), the control of the motor by 80% braking is continued. On the other hand, if V≧a1P+b1, voltage shown in FIG. 8(d) is applied to the motor M, and the motor M is controlled by 60% braking (step 308). Meanwhile, when the speed V reaches the lower limit value, namely, when $V \leq a2P + b2$ (step 306), voltage shown in FIG. 8(c) is applied to the motor M, and the motor M is controlled by full braking. Thus, the motor M is controlled by 80%, 60% or full braking to decelerate between the upper and lower limit values. When the lamp unit 1 reaches coordinates A close to the original position, relations between the position P and the speed V are detected in predetermined sections, and a degree of braking is calculated based upon a result of the detection. The motor M is controlled by braking at the calculated degree to stop simultaneously with the return of the lamp unit 1 to the original position.

Figure 12:
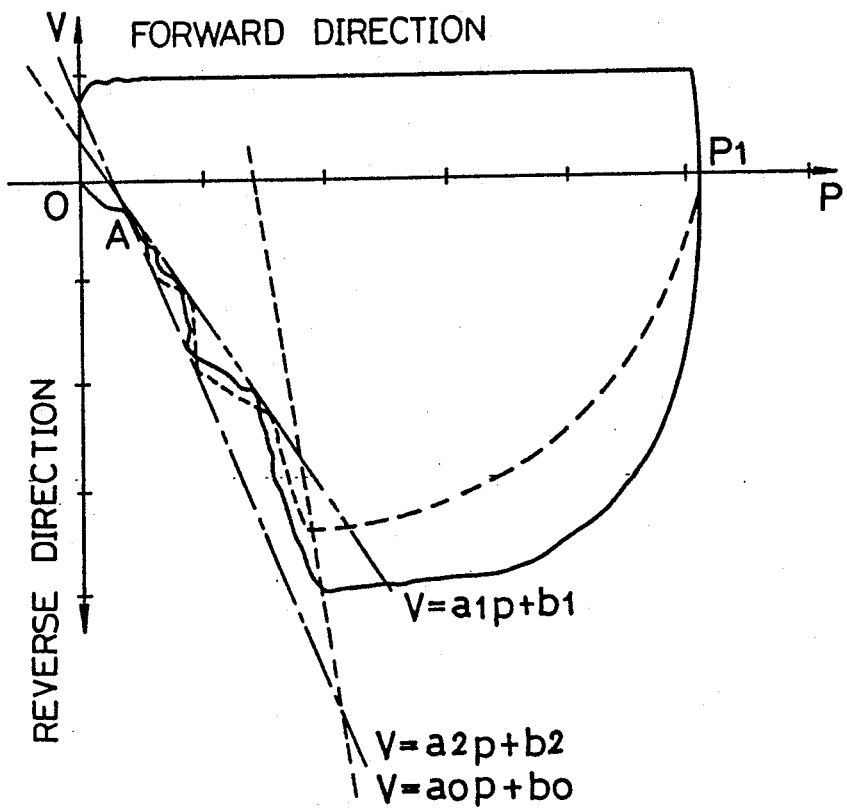
Figure 11B:
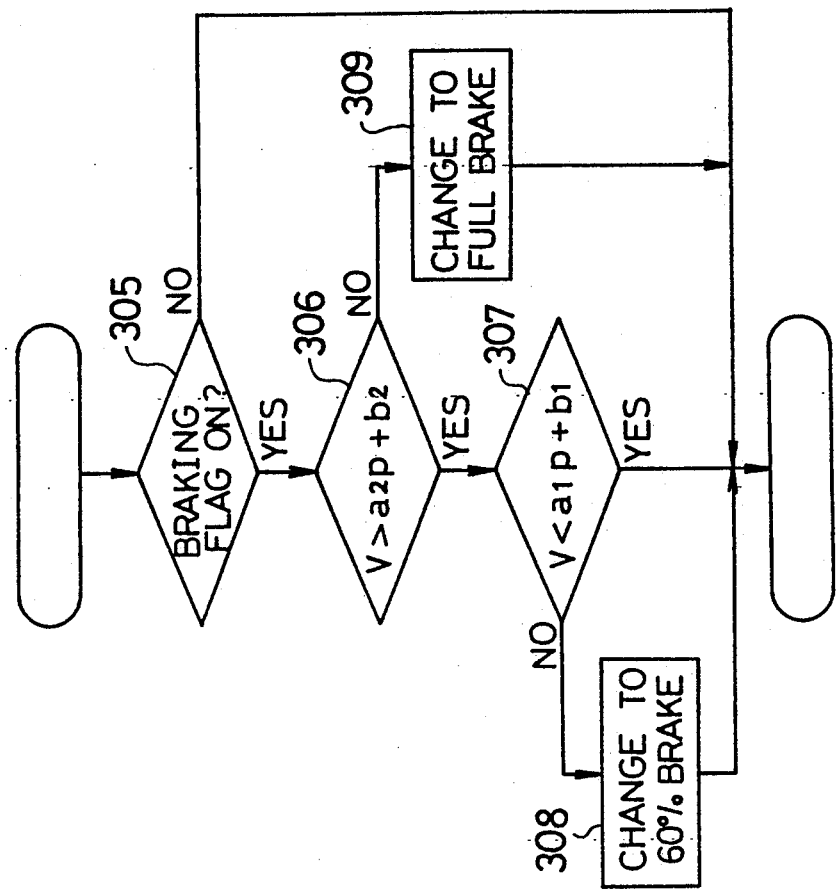
Figure 11A:
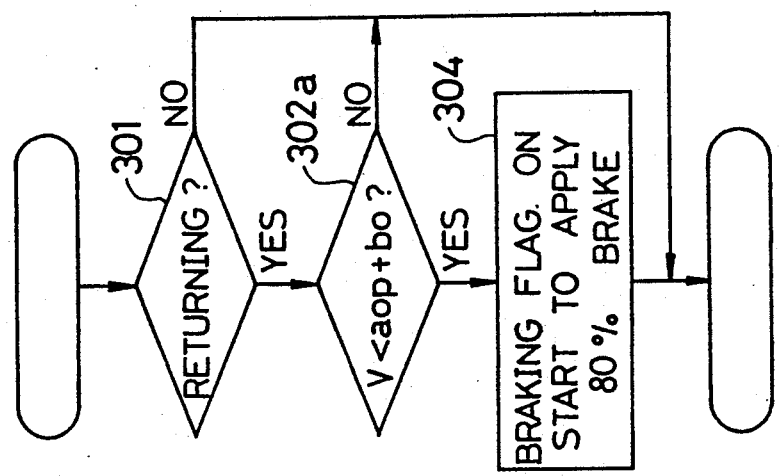

The operation of another embodiment of the control apparatus according to the present invention will be described in conjunction with flow charts in FIG. 11 and a graph in FIG. 12 with another P-V curve. In this case, while the lamp unit 1 is returning, namely, while the motor M is rotating reversely, the motor M is not controlled by braking until a speed of the motor M reaches that given by a formula $V = a0P + b0$ which is preset in the control circuit 11, because a position at which braking is started is not determined (step 302a). Other steps in this operation are common with those in the operation shown in FIG. 9. In this case, even if motor load is increased enough to present a P-V relationship shown as the broken line in FIG. 12 while the lamp unit 1 is returning, a point where braking is started is accordingly set at a position close to the original position. Conversely, if the speed V increases as the load is reduced, braking is started at a point away from the original position. Therefore, even if the speed of the motor varies as the load varies, a point where braking is started is determined according to circumstances, so that the lamp unit 1 is braked without difficulties.

Figure 13B:
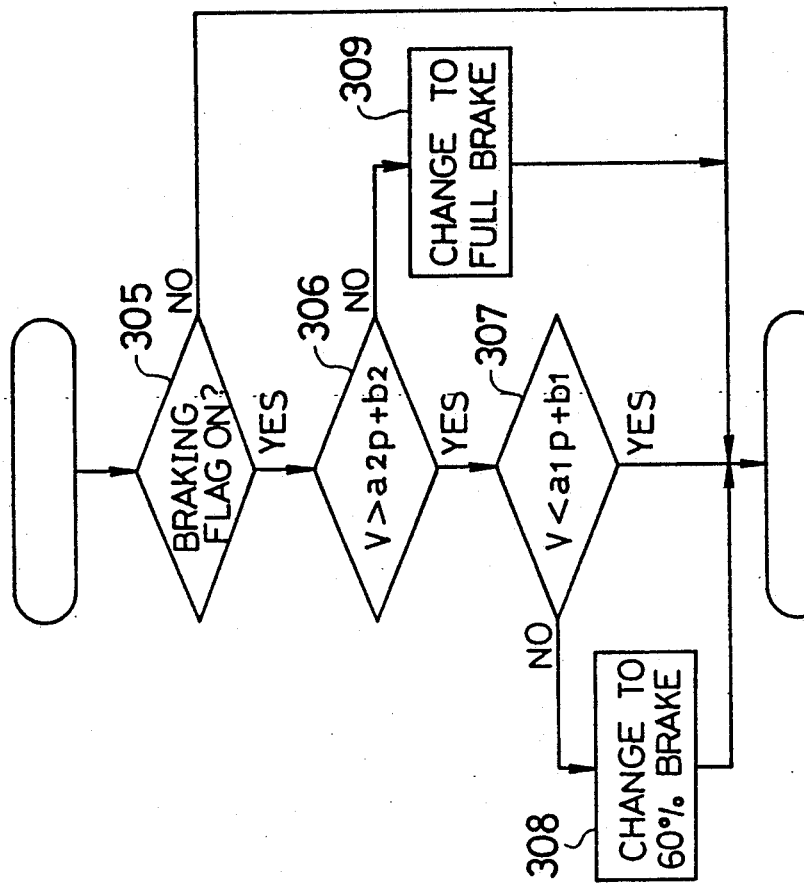
Figure 13A:
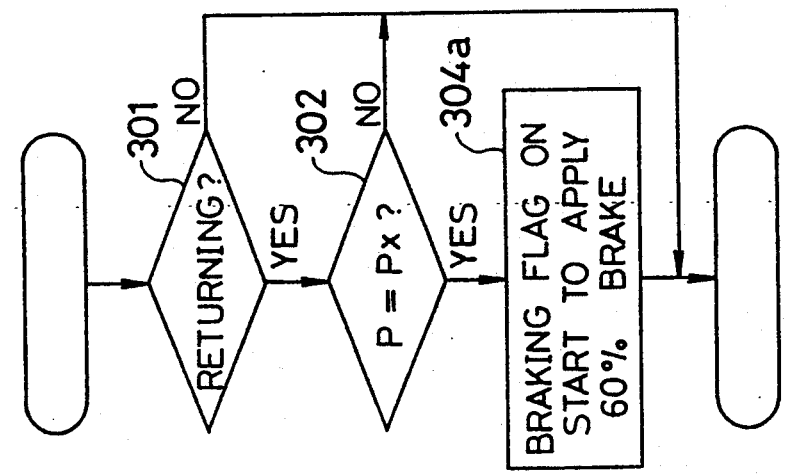
Figure 14:
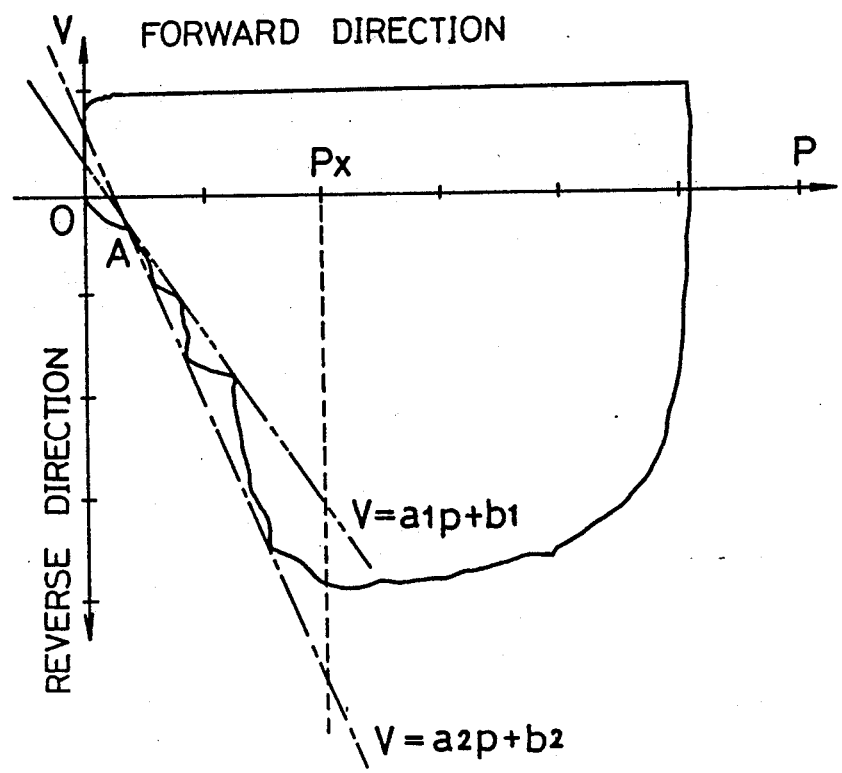

Further, the operation of still another embodiment of the control apparatus according to the present invention will be described in conjunction with flow charts in FIG. 13 and a graph in FIG. 14 showing a P-V relationship. In this case, when the lamp unit 1 which is returning reaches a point where braking is started at step 304a, the motor M is controlled by 60% braking, so that the P-V property accordingly varies. Explanation of other steps in this operation is omitted, because they are common with those in the operation shown in FIG. 9.

Figure 16:
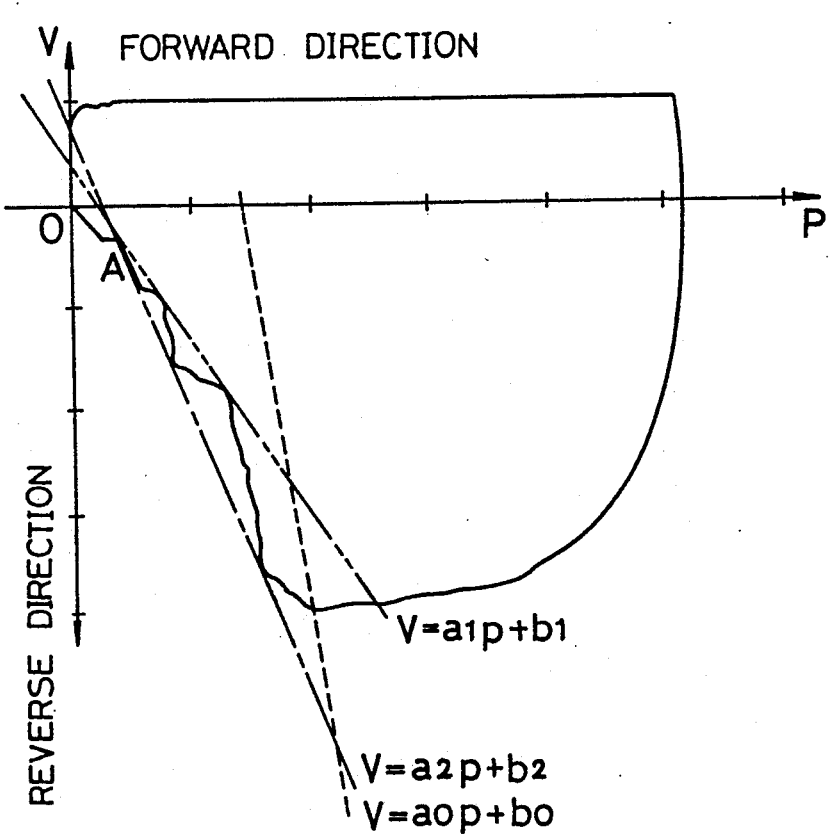
Figure 15B:
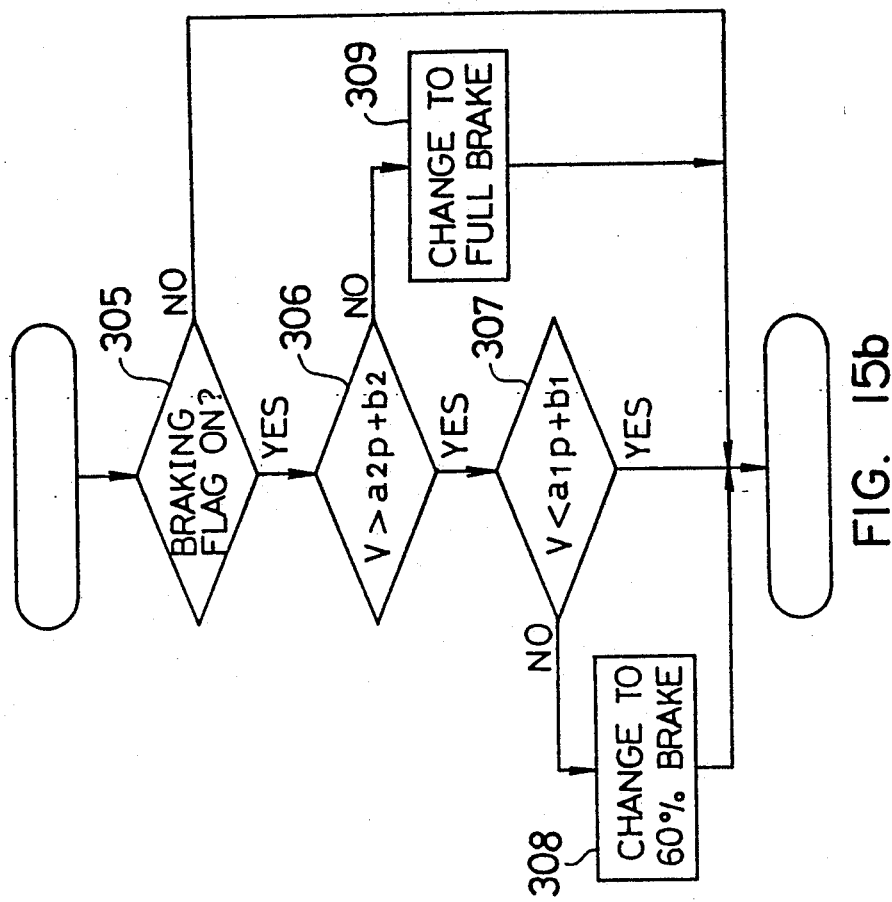
Figure 15A:
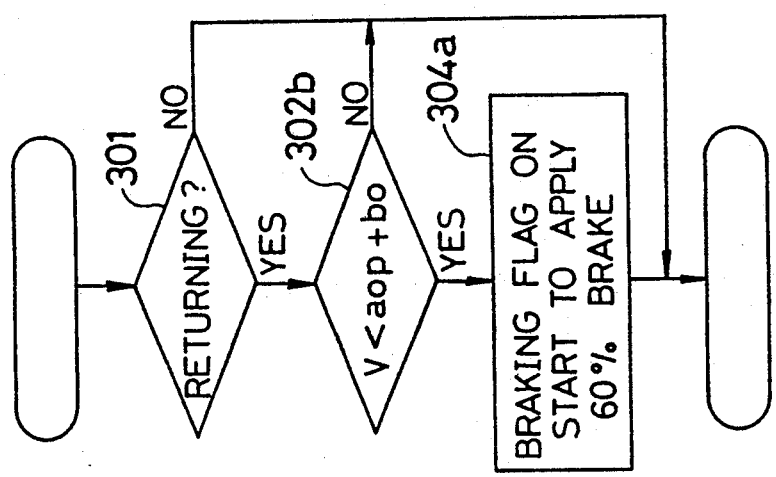

The operation of a further embodiment of the control apparatus according to the present invention will be described in conjunction with flow charts in FIG. 15 and a graph in FIG. 16 showing a P-V relationship. At step 302b, the motor M is braked after its speed comes to satisfy $V = a0P + b0$. Other steps are common with those shown in the flow charts of FIG. 13, and its P-V property is shown in FIG. 16.

Thus, the lamp unit 1 can return to the original position with high accuracy by simply braking the motor M according to a predetermined deceleration rate when the speed V of the lamp unit 1 reaches either of the upper or lower limit values. Accordingly, there is no need to calculate a deceleration rate in each of the predetermined sections. Further, appropriate braking with high accuracy is attained, because even if the load varies while the lamp unit 1 is returning, and a point where braking is started is accordingly determined.

According to the present invention, there is no need for the control apparatus to calculate relations between a position and a deceleration rate of a mobile member in a plurality of sections when the mobile member is braked. Further, the mobile member is braked appropriately with high accuracy, because even if the load of the mobile member varies, and a point where braking is started is accordingly determined.

What is claimed is:
1. A mobile member control apparatus having a motor for accelerating a mobile member to move said member from a first position, for decelerating said mobile member after said member reaches a second position, and for stopping said mobile member at a third position, said apparatus comprising:
speed sensing means for sensing the speed of travel of said mobile member;
position detecting means for detecting the position of said mobile member;
speed presetting means for presetting upper and lower speed limit values, said upper and lower limit values being given as a function of the displacement of said mobile member, said values becoming smaller as said mobile member travels closer to said third position;
deceleration rate presetting means for presetting at least two deceleration rates, large and small;
comparing means for comparing a travel speed received from said speed sensing means with said upper and lower limit values; and
motor control means for decelerating the motor according to either of said large or small deceleration rate when said position detecting means detects that said mobile member has reached said second position, for decelerating said motor according to said large deceleration rate when the speed of travel of said mobile member is greater than or equal to said upper limit value, and for decelerating said motor according to said small deceleration rate when the travel speed of said mobile member is less than or equal to said lower limit value, so that the mobile member is permitted to repeatedly decelerate between two different values that correspond to said upper and lower speed limit values.
2. An apparatus according to claim 1, wherein said upper and lower limit speed values are a linear function of the displacement of said mobile member.
3. An apparatus according to claim 1, wherein said motor control means accelerates and decelerates said motor under PWM control.
4. An apparatus according to claim 1, wherein said speed sensing means and position detecting means include an rotary encoder connected to said motor.
5. An apparatus according to claim 1, wherein said mobile member is comprises an original scanning lamp and a mirror for an electrophotographic copying machine.
6. A mobile member control apparatus having a motor for accelerating a mobile member to move it from a first position and for decelerating said mobile member to stop it at a second position, said control apparatus comprising:
speed sensing means for sensing the travel speed of said mobile member;
position detecting means for detecting the position of said mobile member;
speed presetting means for presetting upper and lower speed limit values, said upper and lower limit values being given as a function of the displacement of said mobile member and said values be- coming smaller as said mobile member travels closer to said second position;

first comparing means for comparing a travel speed received from said speed sensing means with said upper and lower limit values;

deceleration start speed presetting means for presetting a speed at which deceleration is started, said deceleration start speed being a value between said upper and lower limit values, being given as a function of the displacement of said mobile member and becoming smaller as said mobile member approaches said second position;

second comparing means for comparing a travel speed received from said speed sensing means with said deceleration start speed;

deceleration rate presetting means for presetting at least two deceleration rates, large and small; and motor control means for decelerating the motor according to either said large or small deceleration rate when a travel speed of said mobile member equals said deceleration start speed, wherein said control means decelerates said motor according to said large deceleration rate when a travel speed of said mobile member is greater than or equal to said upper limit value, and decelerates said motor according to said small deceleration rate when the travel speed of said mobile member is less than or equal to said lower limit value.

7. An apparatus according to claim 6, wherein said upper and lower limit values speed values are determined as a linear function of the displacement of said mobile member.

8. An apparatus according to claim 6, wherein said motor control means accelerates and decelerates said motor under PWM control.

9. An apparatus according to claim 6, wherein said speed sensing means and said position detecting means include a rotary encoder connected to said motor.

10. An apparatus according to claim 6, wherein said mobile member comprises an original scanning lamp and a mirror for an electrophotographic copying machine.

11. An apparatus according to claim 6, wherein said deceleration start speed is determined as a linear function of the displacement of said mobile member.

* * * * *